US007456992B2

(12) United States Patent
Fukuhara et al.

(10) Patent No.: US 7,456,992 B2
(45) Date of Patent: Nov. 25, 2008

(54) IMAGE PROCESSING DEVICE

(75) Inventors: Toshihiko Fukuhara, Yamatokoriyama (JP); Toshihiro Yamanaka, Ikoma (JP); Syouichirou Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 974 days.

(21) Appl. No.: 10/600,838

(22) Filed: Jun. 19, 2003

(65) Prior Publication Data

US 2004/0008375 A1  Jan. 15, 2004

(30) Foreign Application Priority Data

Jul. 12, 2002 (JP) ............... 2002-204091
Nov. 6, 2002 (JP) ............... 2002-322157

(51) Int. Cl.
G06F 15/00 (2006.01)
G06K 1/00 (2006.01)

(52) U.S. Cl. ............... 358/1.16; 358/1.15; 358/1.13; 358/1.14; 358/1.6

(58) Field of Classification Search ............... 358/1.15, 358/1.14, 1.13, 1.6, 444, 1.16; 713/193; 382/100

See application file for complete search history.

(56) References Cited

U.S. PATENT DOCUMENTS

| 6,275,151 | B1 * | 8/2001 | Gehlot ............... 340/541 |
| 6,665,782 | B2 * | 12/2003 | Capps et al. ............... 711/163 |
| 6,897,975 | B2 * | 5/2005 | Mori et al. ............... 358/1.15 |
| 7,016,071 | B1 * | 3/2006 | Hiraishi et al. ............... 358/1.6 |
| 7,099,110 | B2 * | 8/2006 | Detzler ............... 360/97.02 |
| 7,113,291 | B1 * | 9/2006 | Yamada et al. ............... 358/1.13 |
| 7,130,066 | B1 * | 10/2006 | Kanematu ............... 358/1.15 |
| 7,158,652 | B2 * | 1/2007 | Iwamura ............... 382/100 |
| 7,200,759 | B2 * | 4/2007 | Oerlemans ............... 713/194 |
| 7,262,870 | B1 * | 8/2007 | Namikata ............... 358/1.13 |
| 2001/0024298 | A1 * | 9/2001 | Yoshida ............... 358/444 |
| 2001/0025343 | A1 * | 9/2001 | Chrisop et al. ............... 713/193 |
| 2002/0054326 | A1 * | 5/2002 | Morita ............... 358/1.15 |
| 2002/0171546 | A1 * | 11/2002 | Evans et al. ............... 340/540 |
| 2003/0079078 | A1 * | 4/2003 | Zipprich et al. ............... 711/112 |
| 2005/0225793 | A1 * | 10/2005 | Namikata ............... 358/1.14 |

FOREIGN PATENT DOCUMENTS

| CN | 1202066 A | 12/1998 |
| JP | 10-271299 | 10/1998 |
| JP | 11-065376 | 3/1999 |
| JP | 11-272562 | 10/1999 |

* cited by examiner

Primary Examiner—Edward L Coles
Assistant Examiner—Satwant K Singh
(74) Attorney, Agent, or Firm—Edwards Angell Palmer & Dodge LLP; David G. Conlin; David A. Tucker

(57) ABSTRACT

A digital multifunctional device 1 comprises a control panel 20 with a LCD panel 20 for manipulating various settings, an auxiliary memory 7b for temporarily storing the image data to be processed, an image data destruction means for destructing the image data stored in the auxiliary memory 7b, and an operation restriction means for restricting the image data processing operation. When the digital multifunctional device 1 is to be replaced or discarded, the image data destruction means destructs the image data stored in the auxiliary memory 7b. When the stored image data is destructed by the image data destruction means, the operation restriction means restricts the subsequent image data processing operation and notifies the completion of destruction to a specified administrator.

10 Claims, 13 Drawing Sheets

IMAGE PROCESSING DEVICE

FIELD OF THE INVENTION

The present invention relates to an image processing device that temporarily stores image data in a memory for processing.

DESCRIPTION OF THE RELATED ART

Recent copying machines have become digitalized, and many of them now in the market are designed as a digital multifunctional device provided with a variety of processing abilities that utilize digitalized image data for storage, transmission or the like.

The basic configuration of the digital multifunctional device include a control panel, a scanner unit for reproducing the original image as electronic data, an image processing unit performing a specific process to the computerized image data, and an output unit for outputting the image data.

The output unit of the digital multifunctional device may include an image transmission unit for transmitting the image data to an external device, and a printer unit for reproducing the image data on a recording medium as image.

The digital multifunctional device is further equipped with a memory, such as a hard disc, for temporarily storing the image data.

The digital multifunctional device can be designed to include the functions of a copying machine, a printer, a scanner, a facsimile, and an electronic file. We will explain briefly the flow of image data according to each of the functions.

Copy: The document image being read through the scanner unit is subjected to a predetermined image processing at the image processing unit before being stored temporarily in the memory as final image, and then the image is reproduced on a recording member through the printer unit.

Printer: When the digital multifunctional device receives an output demand of a print job from a client machine connected thereto via a network, the device expands the image data at the image processing unit into a data processable at the printer unit, stores the same temporarily in the memory as final image, and then reproduces the image on a recording member through the printer unit.

Scanner: The document image being read in through the scanner unit is subjected to a predetermined image processing at the image processing unit before being stored temporarily in the memory as final image, and then the image is transmitted to an arbitrary client machine connected via a network to the digital multifunctional device.

Facsimile: The document image being read in through the scanner unit is processed at the image processing unit into an image format that is processable at the destination facsimile device, temporarily stored in the memory as transmission image, and then sent to the arbitrary destination facsimile connected thereto via a telephone network.

Electronic file: Image data is stored in the memory of the digital multifunctional device, and based on the operation of the control panel of the device or the operation from a client machine, a certain image data is selected and the process designated, based on which the image data is processed and output through the output unit.

Thus, the digital multifunctional device functions as a center machine at the installation site to process the image data through various image processing functions. The image data being input through various means are efficiently managed and processed using the memory of the device or the like.

In the memory unit disposed within the digital multifunctional device remains confidential information of the user such as computerized document data input at the installation site or personal information such as the destination telephone number or mail address. When the multifunctional device is replaced or when the device is removed after termination of a lease contract, the user may fear the leakage of confidential and private information.

Patent Document 1, Japanese Patent Laid-Open Publication No. 11-65376, discloses an image forming device equipped with a function for clearing a portion of the data stored in the memory (storage device) of the device and leaving a portion of the data (such as data related to the total number of output or the life-cycle of the device), in order to initialize the image forming device that has been recovered and prepare it for resale. The operation for readjustment of the image forming device to prepare the recovered device for resale can be performed efficiently.

SUMMARY OF THE INVENTION

The present invention provides an image processing device (digital multifunctional device) enabling the user (administrator, owner or right holder) to manipulate or demand a means to destruct (erase or invalidate) the image data stored in the image data storage means (auxiliary memory) and the like and the information required to process the image data (such as the destination information) stored in the image processing device, and subsequently restricting the operation of the device for processing the image data, to thereby reassure the user that no data will be leaked when introducing a new machine.

According to the prior art disclosed in the above document, there is no evidence (record) provided to the user (administrator or owner) indicating that the contents of the memory unit have been erased (cleared) reliably, even when the portion of the memory has been cleared. Therefore, the user cannot confirm whether or not the contents of the memory had been cleared without fail. According to the prior art, when the image processing device is removed, the user of the image processing device cannot be reassured that the information remaining in the storage unit of the device will not leak.

Therefore, the object of the present invention is to reassure the user (owner) of the image processing device (digital multifunctional device) regarding the confidentiality of the data stored in the image processing device when the device is removed. When the user conducts a specific manipulation, the operation for processing the image data will be restricted (for example, the manipulation of the image processing device becomes impossible, and a message notifying that image cannot be processed will be displayed on a display unit of the control panel when power is turned on), reassuring the user that data will not leak.

By simply turning on the power of the image processing device (digital multifunctional device) being recovered from the installation site, one can check whether the image data stored in the imaged at a storage means (auxiliary memory) has been erased or not by confirming the message displayed on the screen of the control panel.

Moreover, when recycling and reselling the image processing device (digital multifunctional device), the device having its image data erased and its image processing operations restricted can recover its image data processing operation when a predetermined manipulation has been performed, such as an exchange of the image data storage means (auxiliary memory).

The present invention aims at solving the problems of the prior art.

The object of the present invention is to provide an image processing device that enables the user to destruct the image data stored in the image data storage unit through an image data destruction unit, and when destruction of image data by the destruction unit is performed, restricts the subsequent operations for processing image data by the operation restricting unit to thereby prevent leak of image data stored in the image processing device at its previous installation site after the device containing the image data storage means has been replaced or discarded.

A further object of the invention is to provide an image processing device capable of reliably destructing (erasing or invalidating) the image data and the information required for processing the image data (such as the destination information) stored in the memory of the digital multifunctional device based on the demand from a user (administrator or owner) and then notifying the completion of the destructing process to the user in order to reassure the user.

The image processing device according to the present invention comprises an operating unit with a display for determining various settings; an image data storage unit for temporarily storing an image data to be processed; an image data destruction unit for destructing the image data stored in the image data storage unit; and an operation restricting unit for restricting the operation for processing the image data when the image data destruction unit destructs the stored image data.

According to the present image processing device, when the device comprising an auxiliary memory (image data storage unit) such as a hard disc is to be replaced or discarded, the image data stored in the auxiliary memory is destructed by the image data destruction unit, and subsequent operation for processing the image data is restricted by the operation restricting unit when the stored image data has been destructed, so that the leakage of image data stored to the memory at the previous installation site of the image processing device is prevented effectively.

The image processing device of the present invention further comprises a destruction designating unit for demanding said image data destruction unit to destruct the stored image data.

According to the present image processing device, the administrator of the device at the installation site can arbitrarily demand the destruction of the image data and the restriction of operation for processing the image data by pressing an all data erase key or a HDD clear key (destruction designating means) on the control panel (operating unit), and thus the administrator can feel reassured when the digital multifunctional device must be replaced or discarded.

Further, according to the present image processing device, the operation restricting unit comprises a function to restrict the operation for processing the image data and to display information related to the restriction on the display of the operating unit.

According to this feature of the present image processing device, the status of the device that the image data processing operation is being restricted is notified to the user through a liquid crystal display (LCD) panel (display unit) disposed on a control panel (operation unit), so the user having ordered the destruction of data can confirm that operation is restricted and be reassured.

Moreover, according to the present image processing device, the operation unit comprises a function to cancel the restriction by the operation restricting unit provided to the operation for processing the image data when a predetermined operation has been verified while said operation restricting unit is restricting the operation for processing the image data.

Based on the present image processing device, while the image processing operation is restricted by the operation restricting means, when a predetermined operation of the device such as the exchange of the auxiliary memory unit is confirmed, the restriction on image data processing operation provided by the operation restricting means can be cancelled. Therefore, even when the auxiliary memory (image data storage unit) is to be replaced with a new one with improved performance to enhance the processing ability of the image processing device, the operator can replace the memory without fear since the restriction can be cancelled by performing a specific operation.

This feature of the invention enables the digital multifunctional device having the image data stored in the auxiliary memory completely destructed to be prepared for resale, and enhances the effective use of resources.

The image processing device according to the present invention further comprises a notifying unit for notifying the completion of destruction of the image data storage region by the image data destruction unit to a predetermined specific right holder.

According to the present invention, the data in the image storage unit (auxiliary memory) can be destructed (invalidated) to prevent leak of data at a future installation site, and the destruction of data is notified to the specific right holder (user) so as to reassure the user that the destruction of data is completed.

Moreover, the user can keep the above notice as a confirmation stating that the image data stored in the memory has been completely destructed.

According further to the present invention, the notifying conditions can be selected, and the notifying conditions of the notifying unit can be selected between an output using a printer function and an output performed by transmitting a notification image data via a network.

Thus, when the image processing device is connected to a LAN or a WAN, even if the device is located at a distance from the user, the user can confirm that the image data in the auxiliary memory has been destructed through a message sent via an email or the like.

For example, by printing out the notice mail, the user can keep a confirmation of the notice that the image data stored in the memory of the device has been destructed.

Moreover, the notifying unit outputs a notice based on a selected notifying condition when all areas of the image data storage region of the image storage unit have been destructed completely by the image data destruction unit.

According to this feature of the invention, the administrator can confirm via the notifying unit that all areas of the auxiliary memory have been destructed.

When the image processing device is to be discarded, the administrator can keep the notice as a confirmation that the destruction process has been completed, so the administrator can be reassured that measures against leakage of data have been taken.

According to the present image processing device, the image data destruction unit comprises a function to destruct a related information required for processing the image data together with the image data stored in said image data storage unit.

This feature of the invention enables the personal data recorded at the installation site, such as the destination information of image data or the information related to the user required for processing the image data, to be destructed by the image data destruction means together with the image data, so that the administrator can be confident that no personal data will leak when the image processing device is replaced or discarded.

DETAILED DESCRIPTION OF THE PREFERRED EMBODIMENT

Figure 1:
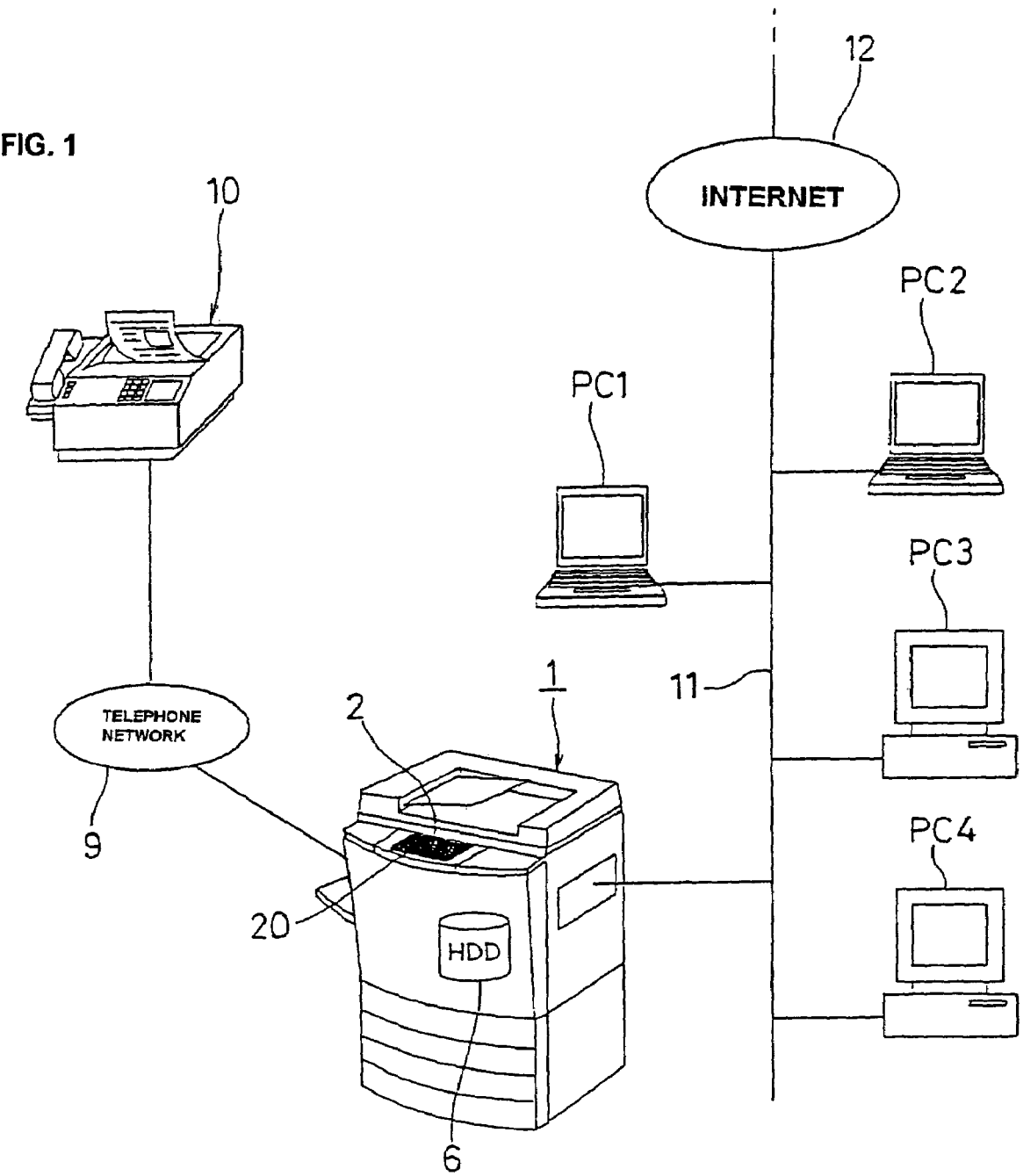
FIG. 1 is an explanatory view showing the configuration enabling the digital multifunctional device (image processing device) to transmit and receive image data via a network connection with external devices.

The preferred embodiments of the present invention will now be explained with reference to the accompanied drawings. In the drawings, a digital multifunctional device is shown as an example of the image processing device.

Embodiment 1

FIG. 1 is an explanatory view showing a digital multifunctional device, which is the image processing device according to embodiment 1 of the present invention, being connected through a network to external devices so as to be able to transmit and receive image data.

Figure 2:
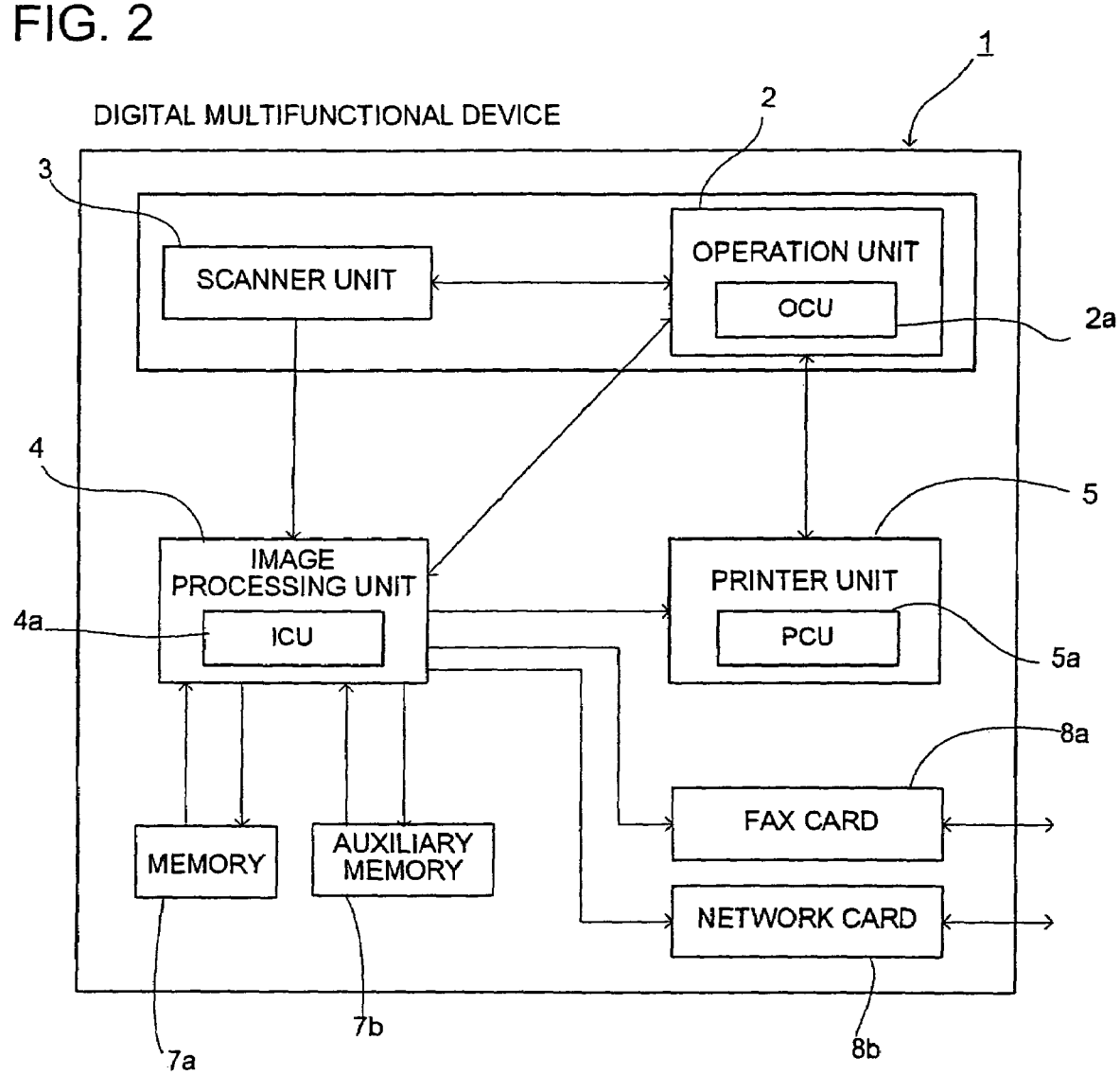
FIG. 2 is a block diagram showing the configuration of the digital multifunctional device (image processing device)

FIG. 2 is a block diagram showing a configuration of the digital multifunctional device being the image processing device according to the first embodiment of the present invention.

The digital multifunctional device 1 being the image processing device according to the present invention comprises a control panel 20 functioning as an operation means enabling various setup operation and having a liquid crystal display (LCD) panel 21 functioning as a display unit, an auxiliary memory unit 7b such as a hard disc functioning as an image data storage means for temporarily storing the image data to be processed, an image data destruction means (not shown) for destructing the image data stored in the auxiliary memory unit 7b, and an operation restriction means (not shown) for restricting the operation for processing the image data when the destruction of the stored image data is performed by the image data destruction means.

In FIG. 1, reference number 1 is a digital multifunctional device which is the image processing device of the present invention, and the digital multifunctional device 1 comprises, as shown in FIG. 2, an operation unit 2, a scanner unit 3, an image processing unit 4, an image storage unit, a communication board, a printer unit 5, and so on.

The digital multifunctional device 1 comprises, as shown in FIG. 1, a HDD (hard disc drive) 6.

The operation unit 2 of the digital multifunctional device 1 comprises an OCU (operator control unit) 2a.

The image processing unit 4 of the digital multifunctional device 1 comprises an ICU (image control unit) 4a.

The printer unit 5 of the digital multifunctional device 1 comprises a PCU (printer control unit) 5a.

The image data storage unit of the digital multifunctional device 1 is composed of a memory 7a and an auxiliary memory unit 7b.

The communication board of the digital multifunctional device 1 is composed of a facsimile card 8a and a network card 8b.

The facsimile card 8a of the digital multifunctional device 1 is connected via a telephone circuit (telephone network) 9 to a destination facsimile device 10, as shown in FIG. 1.

Moreover, the facsimile card 8a of the device 1 enables image data to be transmitted and received between the destination facsimile device 10 via the telephone circuit (telephone network) 9, the image data being transmitted and received according to a content (transmission mode) mutually confirmable on a communication protocol.

The network card 8b of the digital multifunctional device 1 is connected via a network 11 to client devices such as personal computers (PC) PC1, PC2, PC3, PC4 and so on, and further via an internet network 12 to devices belonging to other networks (not shown).

The network card 8b of the digital multifunctional device enables image data to be communicated with client devices (personal computers) PC1, PC2, PC3, PC4 etc. which are connected thereto via network 11, and further enables image data to be communicated with devices belonging to other networks via the internet network 12.

Further, the network card enables the digital multifunctional device to receive print jobs transmitted from client devices PC1, PC2, PC3, PC4 etc. and to print out the image on a recording member, and to enable the image data read in through a scanner unit 3 to be transferred to the client devices PC1, PC2, PC3, PC4 etc.

Further, the users of the client devices PC1, PC2, PC3, PC4 etc. can perform a remote control of a mass storage such as a hard disc disposed in the digital multifunctional device 1 via network 11, such as requesting storage of image data sent from the client device PC1 etc. to the mass storage (hard disc), demanding specific stored image data or requesting new transmission.

The digital multifunctional device 1 comprises an operation unit 2, a scanner unit 3 for electronically scanning the document image, an OCU (operator control unit) 2a for controlling the whole of the digital multifunctional device 1, controlling the scanner unit 3 and controlling the operation unit 2, an image processing unit 4 for performing a general process of the image data being processed at the digital multifunctional device 1, an ICU (image control unit) 4a of the image processing unit 4, a printer unit 5 for reproducing and outputting as recorded object the image data being input to the digital multifunctional device 1, a PCU (printer control unit) 5a of the printer unit 5, a memory 7a for processing that expands the image to be processed, an auxiliary memory unit 7b such as a hard disc for temporarily storing the image data to be processed, a facsimile card 8a which is a facsimile communication board connected to the telephone circuit 9, and a network card 8b which is a network communication board connected to the network 11.

It is also possible to add on to the digital multifunctional device 1 other processing units required to execute new functions, or to delete one or more functions, or to share units (processing blocks). In such cases, a portion of the configuration will be varied.

According to the digital multifunctional device 1, the image data being read via the scanner unit 3 is sent one page at a time to the memory 7a through the image processing unit 4. The image processing unit 4 reads the image data corresponding to a single page from the memory 7a or develops the same into the memory while providing an appropriate process to the image data as demanded through the operation unit 2, and then sequentially stores the image data to the auxiliary memory unit (hard disc) 7b.

The facsimile card 8a and the network card (NIC) 8b are designed to store one page worth of image data when receiving the image from an external device to the digital multifunctional device before transmitting the same to the image processing device 4, and designed to receive image data in one-page units at a time from the image processing device 4 when transmitting the same to the external device.

Figure 3:
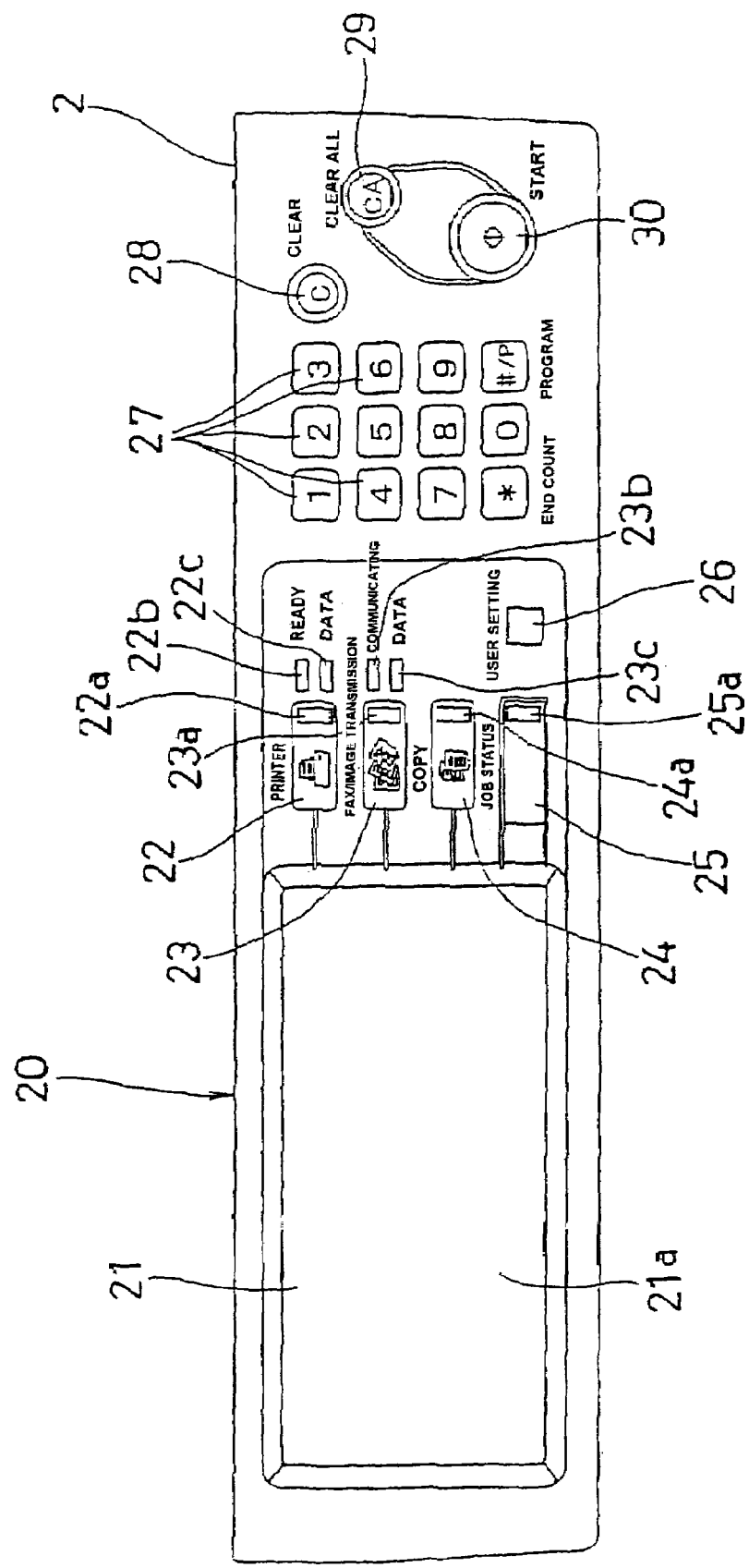
FIG. 3 is an explanatory view showing the control panel of the digital multifunctional device (image processing device)

FIG. 3 is an explanatory view showing the control panel of the digital multifunctional device which is the image processing device according to the present embodiment.

The operation unit 2 of the digital multifunctional device 1 comprises a control panel 20, and to one side of the control panel 20 is disposed a LCD panel 21 functioning as a screen for displaying various information. A transparent tablet (transparent touch panel) 21a is disposed on the surface of the liquid crystal display panel 21.

A guidance information or an operation key can be displayed on the liquid crystal display panel 21. The user can press (touch) the operation key area while confirming the guidance information displayed on the LCD panel 21, by which the designation of operation for the digital multifunctional device can be performed through the transparent tablet 21a.

On the other side of the LCD panel 21 are disposed various mode setup keys.

Adjacent the LCD panel 21 are disposed as mode switching keys, which are, from the top, a "printer" key 22 for confirming the status of the printer mode, a "facsimile/image transmission" key 23 for transmitting an image data by facsimile or through a network, and a "copy" key 24 for designating a copy mode. Further, below the mode switching keys is disposed a "job status" key 25 for confirming the status of the job being processed by the device 1 and the received job (reserved job).

The keys 22 through 25 are provided with LED lamps 22a through 25a, respectively, which indicate whether each key has been manipulated or not, and on the right side of the "printer" key 22 and the "facsimile/image transmission" key 23 are provided a set of LED lamps 22b, 22c and a set of LED lamps 23b, 23c, respectively, which indicate the status of communication being connected with external devices.

Moreover, on the side of the "job status" key 25 is disposed a "user setup" key 26, and by manipulating the "user setup" key 26, a setup screen for setting (adjusting) the mode of the digital multifunctional device 1 is displayed on the LCD panel 21, according to which a specific administrator and the like can setup the mode to correspond to the environment of the installation site of the device etc. using the transparent tablet 21a and ten keys 27.

Further, a "ten" key 27 used for entering numeral data such as the number of copies required or the telephone number etc., a "clear" key 28 for correcting the input data, an "all clear" key 29 for initializing the mode, and a "start" key 30 for indicating start of operation to the digital multifunctional device 1, are disposed on the control panel 20.

Regarding the above mentioned keys, it is possible for additional keys to be disposed to correspond to further functions to be added to the digital multifunctional device 1, or for some of the keys mentioned above to be deleted in advance when a certain function is not provided to the device 1. It is also possible for some keys to be restricted of operation temporarily (that is, the key will not respond even when manipulated), considering the case where an optional function may be added in the future.

According to the digital multifunctional device 1 of the present invention, the control panel 20 further comprises an "erase all data" key 34A and "HDD clear (image only)" key 34B functioning as destruction designation means for demanding destruction of stored image data corresponding to the image data destruction means.

According to the digital multifunctional device 1 of the present invention, the image data destruction means comprises a function to destruct the image data stored in the auxiliary memory unit 7b together with the related information necessary for processing the image data.

According to the present digital multifunctional device 1, the operation restriction means restricts the image data processing operation, and further comprises a function to display on the LCD panel 21 of the operation panel 20 the information related to the limitation.

According to the present invention, when a predetermined operation is confirmed during the state in which the operation for processing the image data is restricted by the operation restriction means, the restriction of operation for processing the image data by the operation restriction means is cancelled.

Figure 4:
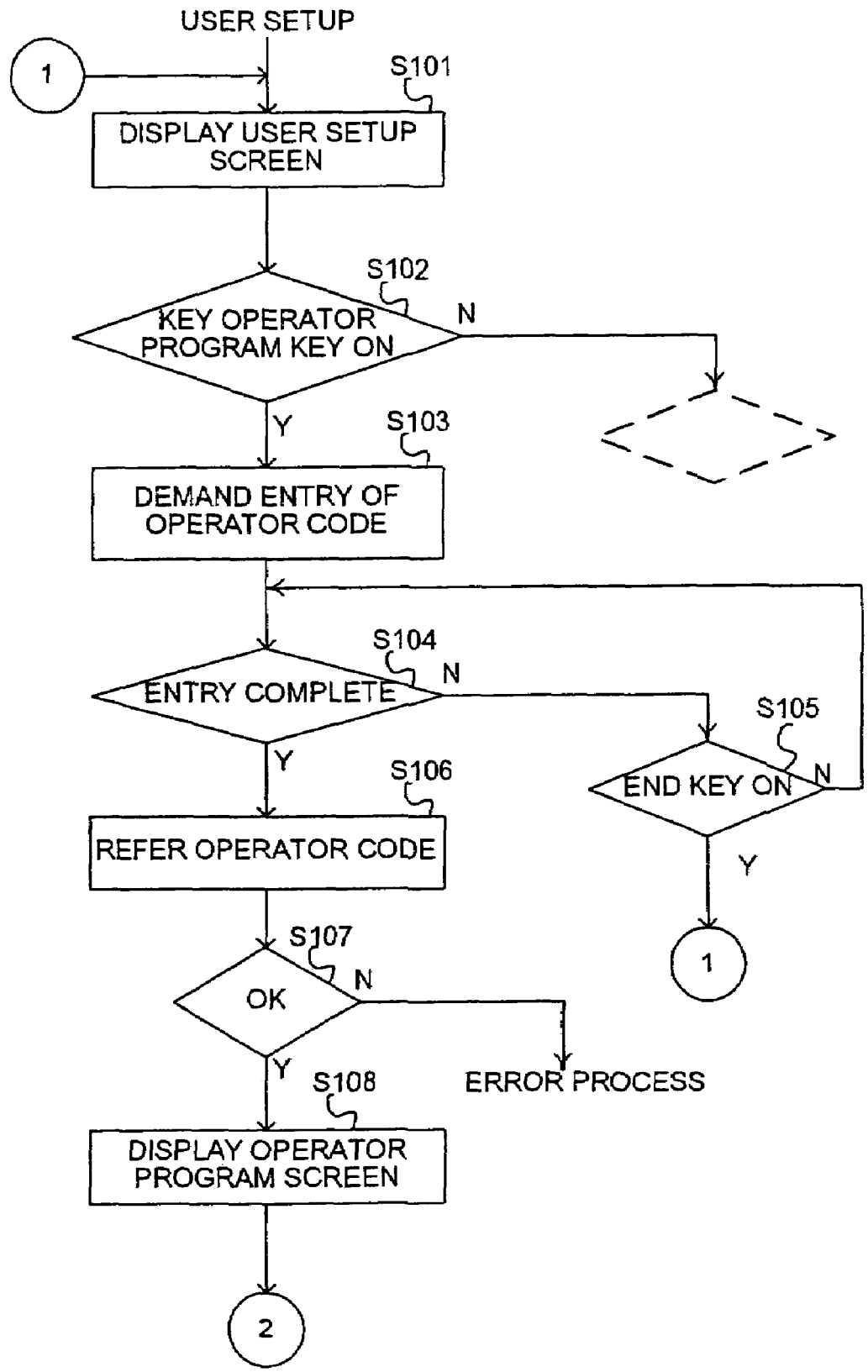
FIG. 4 is a flowchart showing the flow of operation steps for restricting the image data processing operation.
Figure 5:
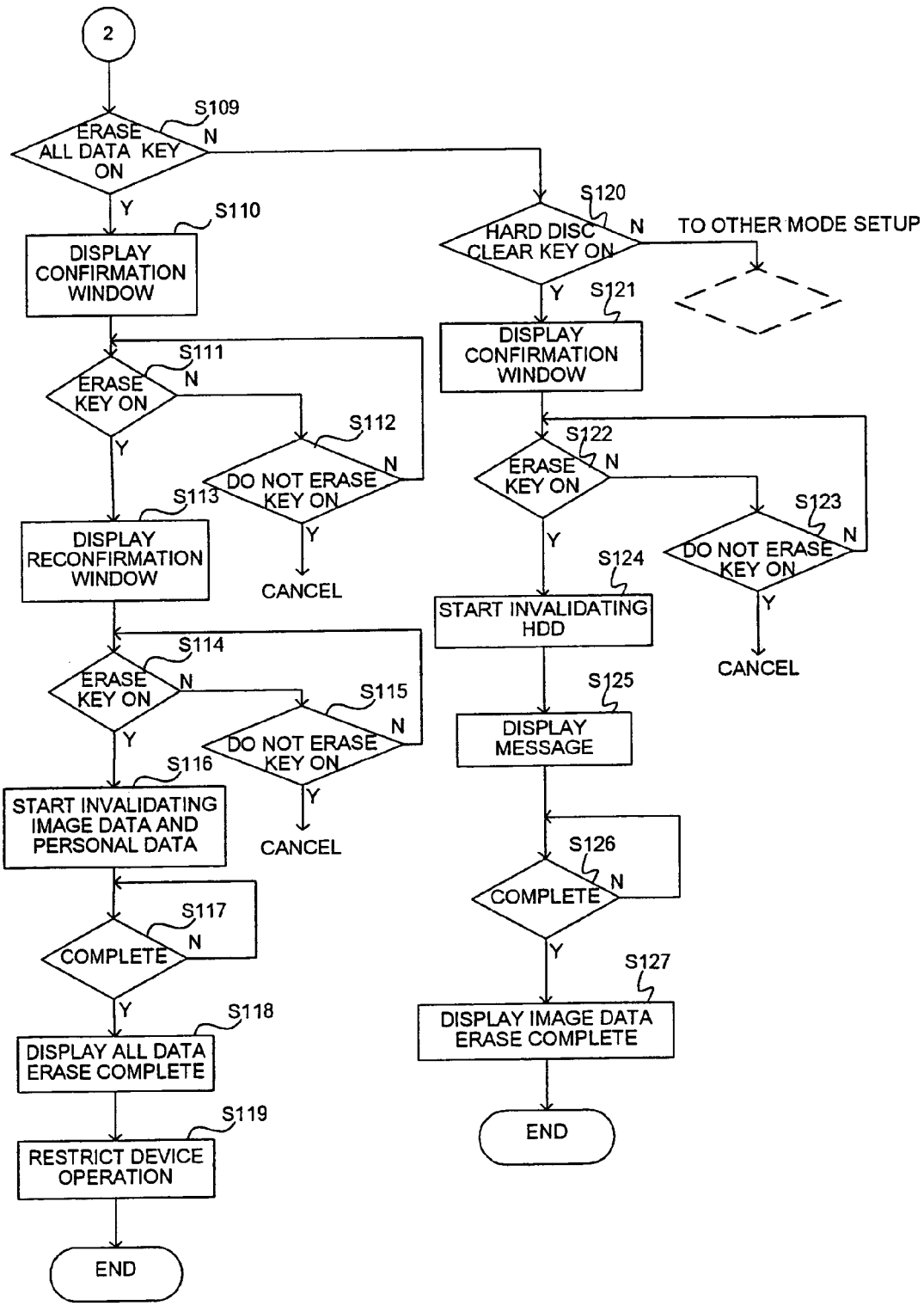
FIG. 5 is a flowchart continuing from FIG. 4.

Next, FIGS. 4 and 5 show flowcharts illustrating the manipulation steps for restricting the image data processing operation of the image processing device by a predetermined manipulation of the digital multifunctional device according to the present invention, and FIGS. 6 through 13 are explanatory views showing an example of the screen being displayed on the liquid crystal display panel during the manipulation steps for restricting the image data processing operation by a predetermined manipulation of the present digital multifunctional device.

As for the basic process flow, the image data processing is started by manipulating the "user setup" key 26 provided on the control panel 20 of the digital multifunctional device 1 shown in FIG. 3.

Figure 6:
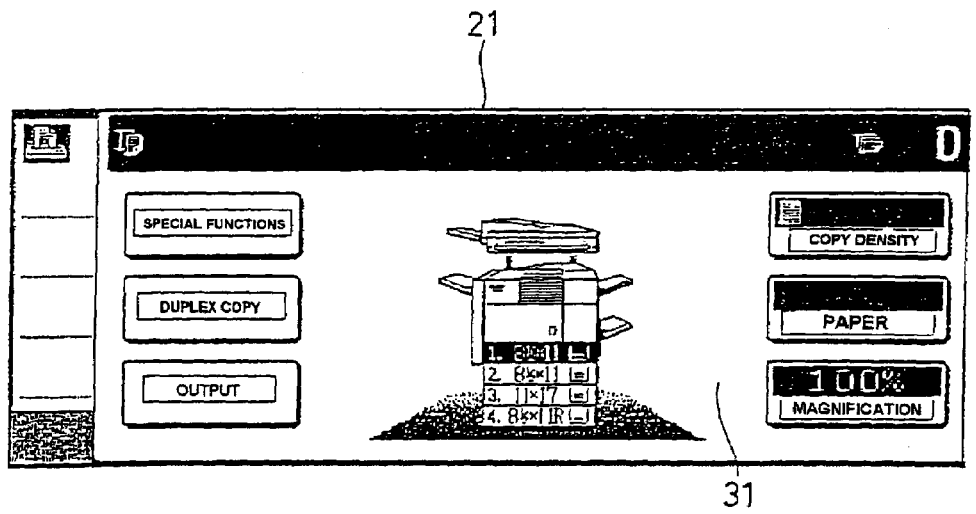
FIG. 6 is an explanatory view showing the basic screen displayed on the control panel.
Figure 7:
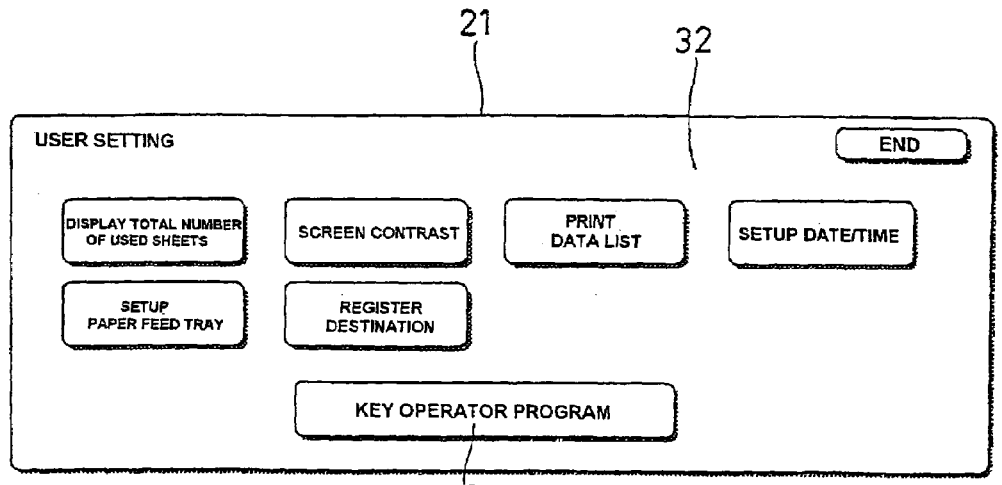
FIG. 7 is an explanatory view showing the user setup screen displayed on the control panel.

When the "user setup" key 26 on the control panel 20 is pressed, the display screen of the LCD panel 21 on the control panel 20 is changed from a basic screen 31 shown in FIG. 6 to a user setup screen 32 shown in FIG. 7. On the user setup screen 32 of the panel 21, a "key operator program" key 32A functioning as an entrance for transition to a "key operator program" mode is displayed (step S101).

Figure 8:
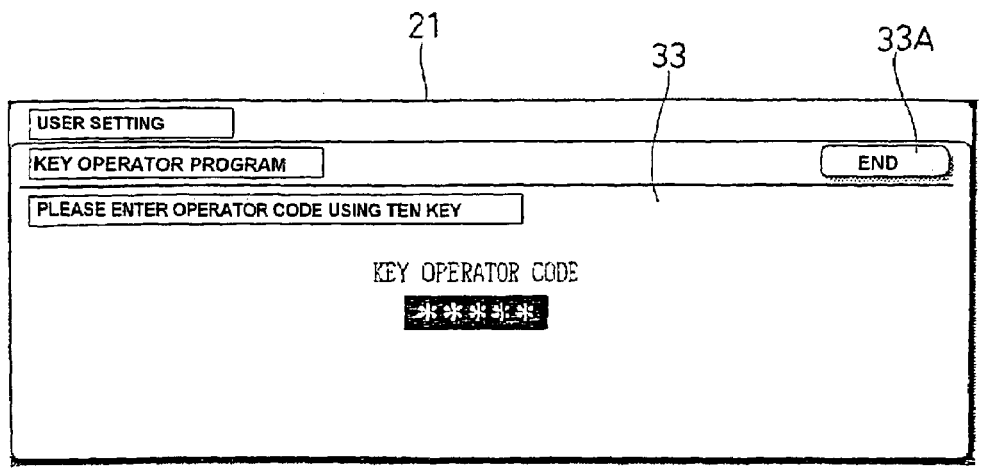
FIG. 8 is an explanatory view showing the key operator code input screen displayed on the control panel.

When the manipulation of the "key operator program" key 32A displayed on the user setup screen 32 of the LCD panel 21 is confirmed (step S102), the display screen of the LCD panel 21 is changed from the user setup screen 32 shown in FIG. 7 to a key operator code input screen 33 shown in FIG. 8 to thereby request a key operator code to be entered through use of the "ten" key 27 provided on the control panel 20 of the device 1 shown in FIG. 3 in order to confirm that the specific administrator (right holder) is manipulating the key operator program (step S103)

When the code data input using the "ten" key 27 on the control panel 20 is confirmed (step S104), the input code information is verified with the code data being registered in advance, thereby confirming that the specified administrator (right holder) is manipulating the device, and if there is no problem, the procedure advances to the next step (step S106).

When the key operator code is not entered through the "ten" key 27 on the control panel 20, and the "end" key 33A displayed on the upper right corner of the key operator code input screen 33 shown in FIG. 8 is manipulated, this input mode is cancelled, and the screen of the LCD panel 21 on the control panel 20 is changed from the key operator code input screen 33 shown in FIG. 8 to the user setup screen 32 shown in FIG. 7 (step S105).

Figure 9:
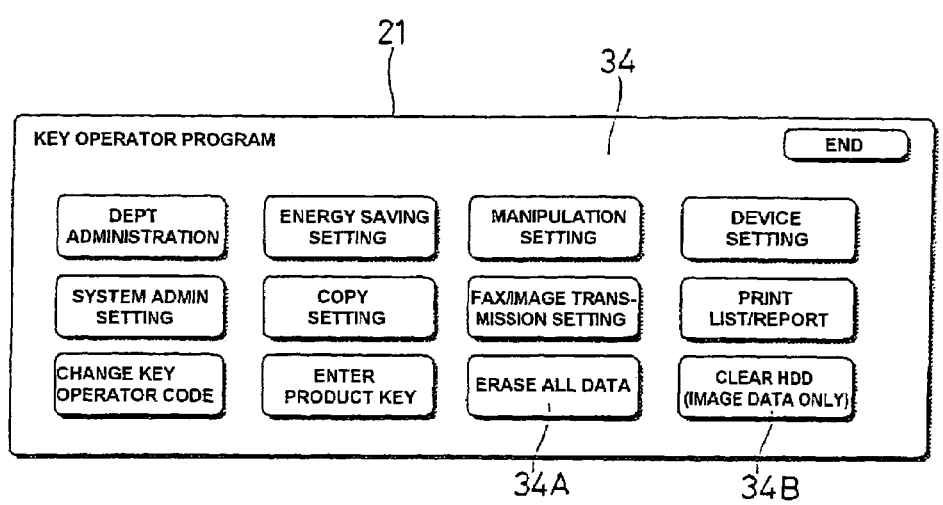
FIG. 9 is an explanatory view showing the specific setup screen of the key operator program displayed on the control panel.

Next, when it is confirmed by the code data input through the "ten" key 27 on the panel 20 that the user is the specified administrator (right holder) (step S107), the displayed screen on the LCD panel 21 is changed from the key operator code input screen 33 shown in FIG. 8 to a specific setup screen 34 of the "key operator program" shown in FIG. 9. As shown in FIG. 9, in the specific setup screen 34 of the "key operator program" on the LCD panel 21, a list of items whose manipulation and setup are limited, such as the mode setup of the device body, is displayed. The specified administrator (right holder) manipulates (selects) either the "erase all data" key 34A or the "HDD clear (image only)" key 34B from the list of items (step S108).

First, the "erase all data" mode is for invalidating (erasing) all the personal data stored in the hard disc or nonvolatile memory at the installation site such as the image data and the destination data.

Next, the "HDD clear (image only)" mode is for invalidating (erasing) the image data stored in the hard disc.

When the specified administrator (right holder) selects (manipulates) these functions when needed, the personal data stored in the hard disc or the nonvolatile memory equipped to the digital multifunctional device 1 can be prevented from being deliberately read by others.

Methods for invalidating (erasing) the image data include formatting the hard disc by overwriting blank data on the hard disc, overwriting discontinuous image data generated by random numbers, or writing in image data repeatedly for a number of times to thereby complicate reproduction of the image data.

Figure 10:
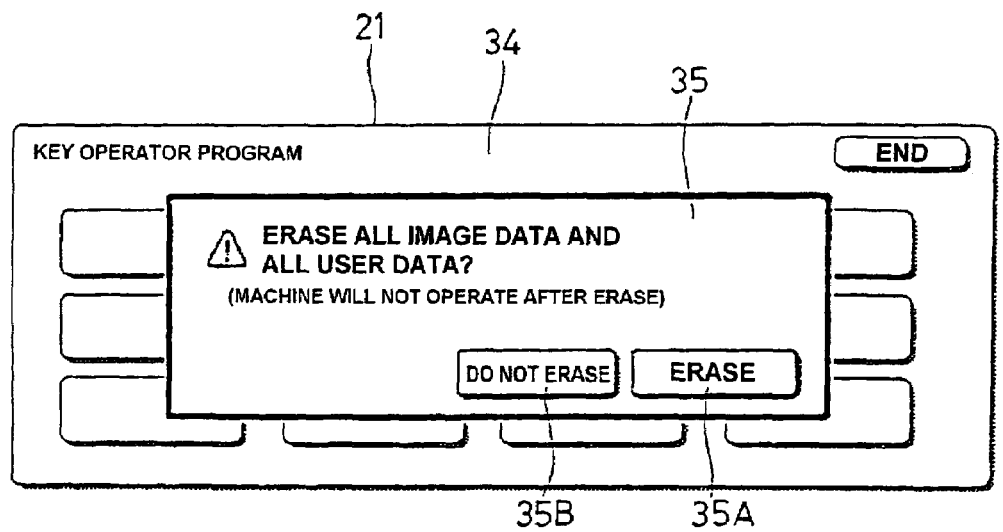
FIG. 10 is an explanatory view showing the confirmation window for all data erase operation displayed on the specific setup screen of the key operator program on the LCD panel.

In this environment, when the "erase all data" key 34A of the "key operator program" is manipulated or selected (step S109), a confirmation window 35, an example of which is shown in FIG. 10, is displayed over the specific setup screen 34 of the "key operator program" on the LCD panel 21 in order to confirm whether to actually erase all data with the specified administrator (right holder), since the manipulation of the key 34A causes all the image data and the personal information such as the destination data required to process the image data to be erased from the auxiliary memory 7b (the hard disc etc.) equipped to the digital multifunctional device 1, and future image data processing operation to be restricted (step S110).

Figure 11:
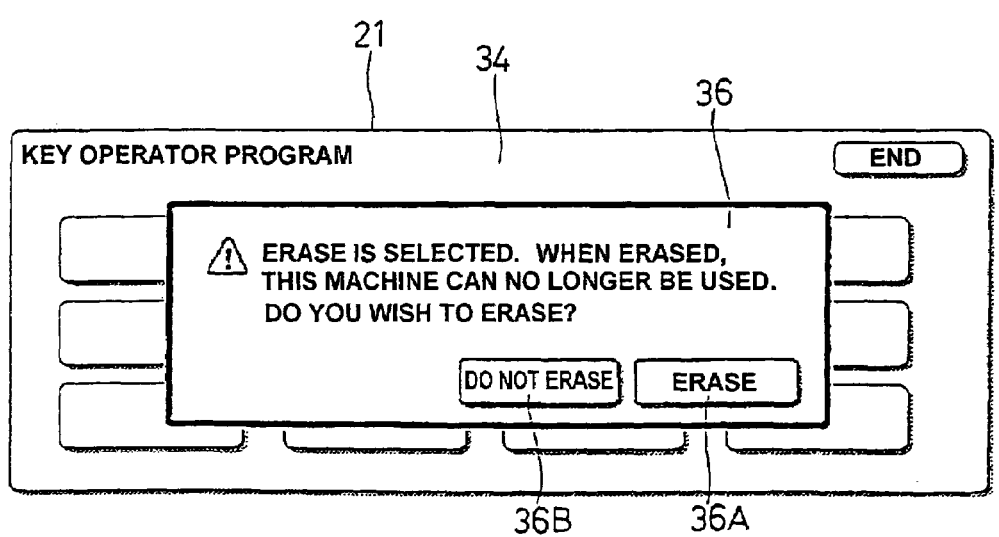
FIG. 11 is an explanatory view showing the reconfirmation window for all data erase operation displayed on the specific setup screen of the key operator program on the LCD panel.

At this time, when the specified administrator manipulates the "erase" key 35A displayed on the confirmation window 35 shown in FIG. 10 (step S111), an erase all data reconfirmation window 36 as shown in FIG. 11 is displayed over the specific setup screen 34 of the "key operator program" on the LCD panel 21, and confirms for the last time whether to erase all data with the specified administrator (step S113).

If the specified administrator manipulates the "do not erase" key 35B displayed on the confirmation window 35 of FIG. 10 (step S112), the procedure for all data erase mode is cancelled.

When the reconfirmation window 36 is displayed on the screen and the specified administrator manipulates the "erase" key 36A displayed on the reconfirmation window 36 shown in FIG. 11 (step S114), the image data and the personal data such as the destination data required to process the image data stored in the auxiliary memory 7b are invalidated (erased) by the above-mentioned method or the like.

At this time, a message such as "Erasing contents of HDD . . . " is displayed on the screen of the LCD panel 21 on the control panel 20, notifying the specific user that the image data stored in the hard disc of the digital multifunctional device 1 is being invalidated or erased (step S116).

On the other hand, when the specific administrator manipulates the "do not erase" key 36B displayed on the reconfirmation window 36 shown in FIG. 11 (step S115), the "erase all data" mode process can be cancelled.

Lastly, when the operation for invalidating (erasing) the image data stored in the hard disc is completed (step S117), a message notifying that the invalidation (erasing) operation of all the data on the hard disc equipped to the digital multifunctional device 1 is completed is displayed on the screen of the LCD panel 21 of the control panel 20 (step S118), and thereafter, the operation for processing the image data as an image processing device is restricted (step S119).

In this embodiment, what is meant by restricting the operation for processing the image data as an image processing device is to completely lock the operation for processing the image data so as to reassure the user discarding the image processing device that the image data is disposed (reassure data security). However, it is also possible to restrict only a portion of the functions of the device, such as prohibiting use of the mass-storage system or hard disc (in other words, prohibiting access to the mass-storage system) disposed in the image processing device.

Figure 12:
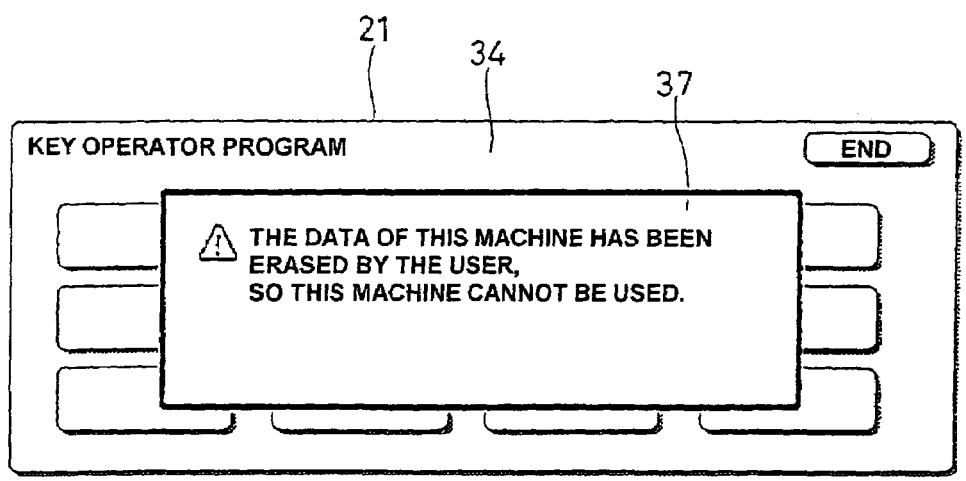
FIG. 12 is an explanatory view showing the confirmation window notifying that the all data erase operation has been completed displayed on the specific setup screen of the key operator program on the LCD panel.

Distributors will retrieve the used image processing device when the device is at the above state (in which the operation of the device is restricted). If the distributor wishes to check the status of the image processing device, such as whether the image data in the hard disc of the device is erased or not, a confirmation window 37 notifying that "erase all data" process is completed as shown in FIG. 12 is displayed over the specific setup screen 34 of the "key operator program" of the LCD panel 21 on the control panel 20 simply by turning on the main switch of the image processing device body. Thus, it is easily confirmed at the distributor that the image data stored in the hard disc equipped to the digital multifunctional device 1 has been invalidated (erased) completely.

Also at the installation site, when the process for erasing all the data has been executed, the confirmation window 37 will be displayed on the control panel 20 when the main power is switched on, so that the user can confirm and be assured that personal data has been erased completely.

The image processing device can be further provided with a means for recovering the normal status from the above status in which the operation for processing the image data is restricted by performing a specific manipulation, thus enabling the distributor to perform maintenance of the retrieved image processing device and to prepare the device for resale.

Considering data security, the above-mentioned specific manipulation can be, for example, the replacement of the mass storage (hard disc etc.) before canceling the status in which the operation for processing the image data is restricted in the image processing device.

Usually, data specific to the device is managed in the hard disc, so whether the hard disc is replaced or not can be checked by confirming whether the stored data is varied from the data stored in the previous hard disc.

As for another possible example, the above-mentioned specific manipulation for canceling the image data processing operation restricted status can be a continued or simultaneous manipulation of a plurality of keys which is unexpected from normal manipulation.

Next, the process following the manipulation of the "HDD clear (image only)" key 34B in the "key operator program" for invalidating (erasing) only the image data stored in the auxiliary memory 7b such as the hard disc equipped to the digital multifunctional device 1 will be explained.

Figure 13:
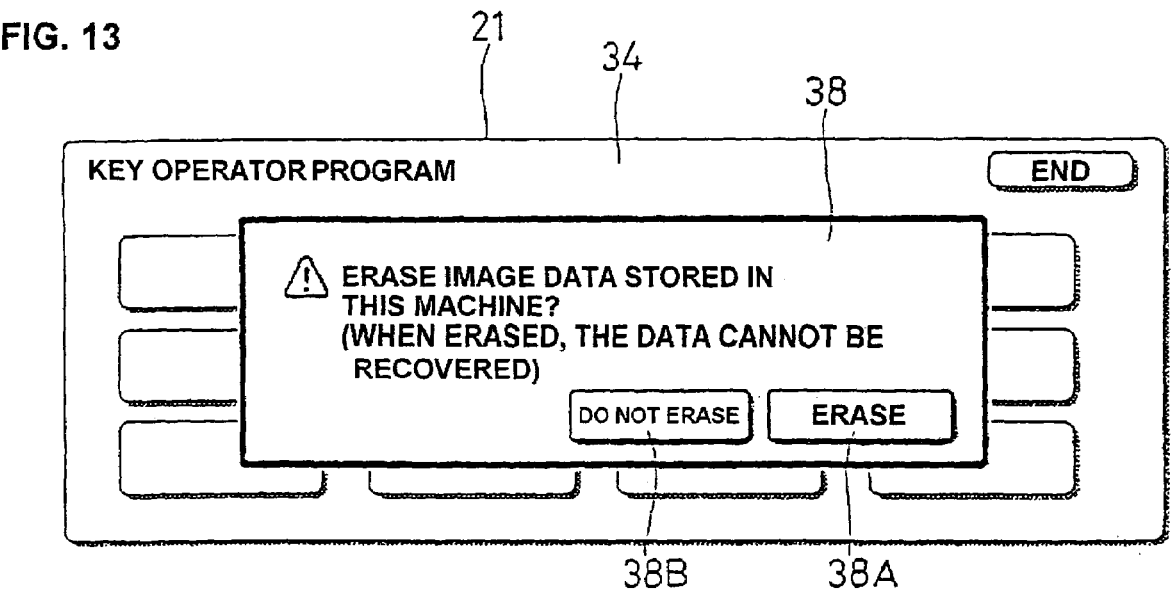
FIG. 13 is an explanatory view showing the confirmation window for image data erase operation displayed on the specific setup screen of the key operator program on the LCD panel.

While the specific setup screen 34 of the "key operator program" is displayed on the screen of the LCD panel 21 as shown in FIG. 9 (step S108), when the "HDD clear (image only)" key 34B is manipulated or selected in the "key operator program" (step S120), a confirmation window 38 confirming erase of image data as shown in FIG. 13 is displayed over the specific setup screen 34 of the "key operator program" on the LCD panel 21 (step S121).

At this time, if the "erase" key 38A displayed on the image data erase confirmation window 38 is selected (step S122), the procedure for invalidating (erasing) the image data on the hard disc equipped to the digital multifunctional device 1 is started (step S124), but if the "do not erase" key 38B in the image data erase confirmation window 38 is selected (step S123), the HDD clear mode process is canceled.

When the invalidation (erase) of image data stored in the hard disc is started, a message notifying that the invalidation process is being performed is displayed as a window (step S125), and when the erasing of image data is completed (step S126), a message notifying that the erasing operation of image data stored in the hard disc has been completed is displayed for the specified administrator (step S127).

The above is the process flow when the "HDD clear (image only)" key 34B is selected, but it is also possible to reconfirm whether to erase the image data, similar to the case where the "all data erase" key 34A is selected, before actually invalidating the image data stored in the hard disc when the "erase" key 38A is selected.

Embodiment 2

According to this embodiment, the digital multifunctional device outputs a destruction process completion notice when the selected destruction process has been completed.

The notice can be output by printing out the data related to the completed process on a recording medium, or by sending a notice via a communication means such as an electronic mail to a designated destination.

Figure 14:
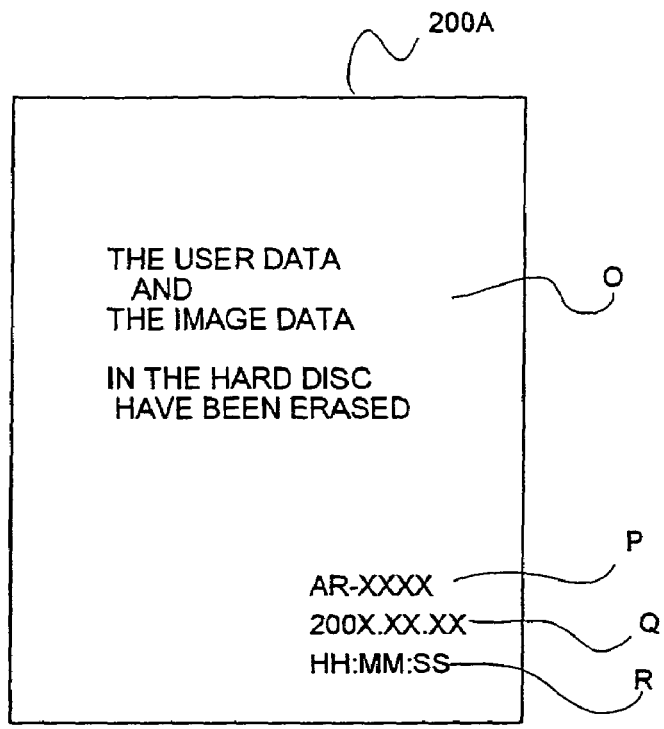
FIG. 14 is an example of the confirmation (notice)
Figure 15:
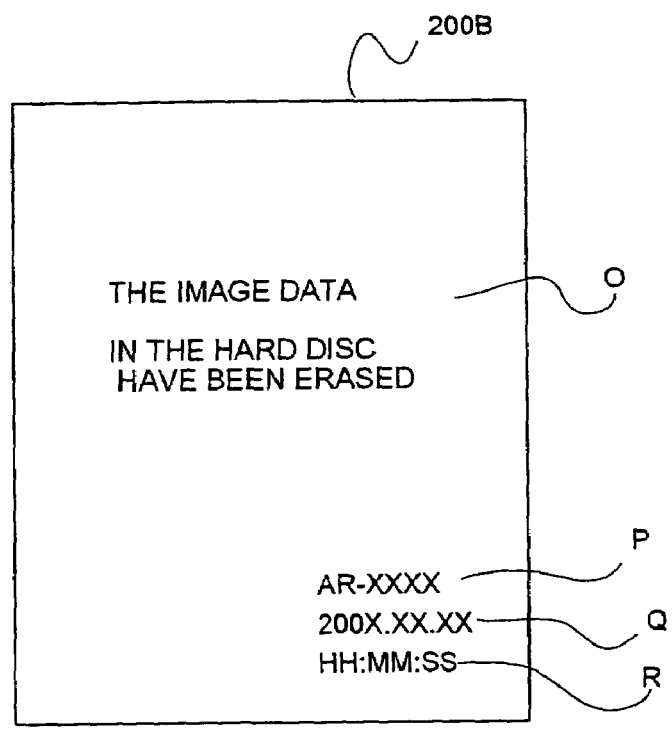
FIG. 15 is an example of the confirmation (notice)

An example of a notice content 200A output when "erase all data" is selected is shown in FIG. 14, and an example of a notice content 200B output when "HDD clear" is selected is shown in FIG. 15.

The contents being notified include without limitation, as shown, the content of the erased data O, the model of the machine P, the date Q and the time R. Other contents are possible, as long as they show what has been erased.

Figure 16:
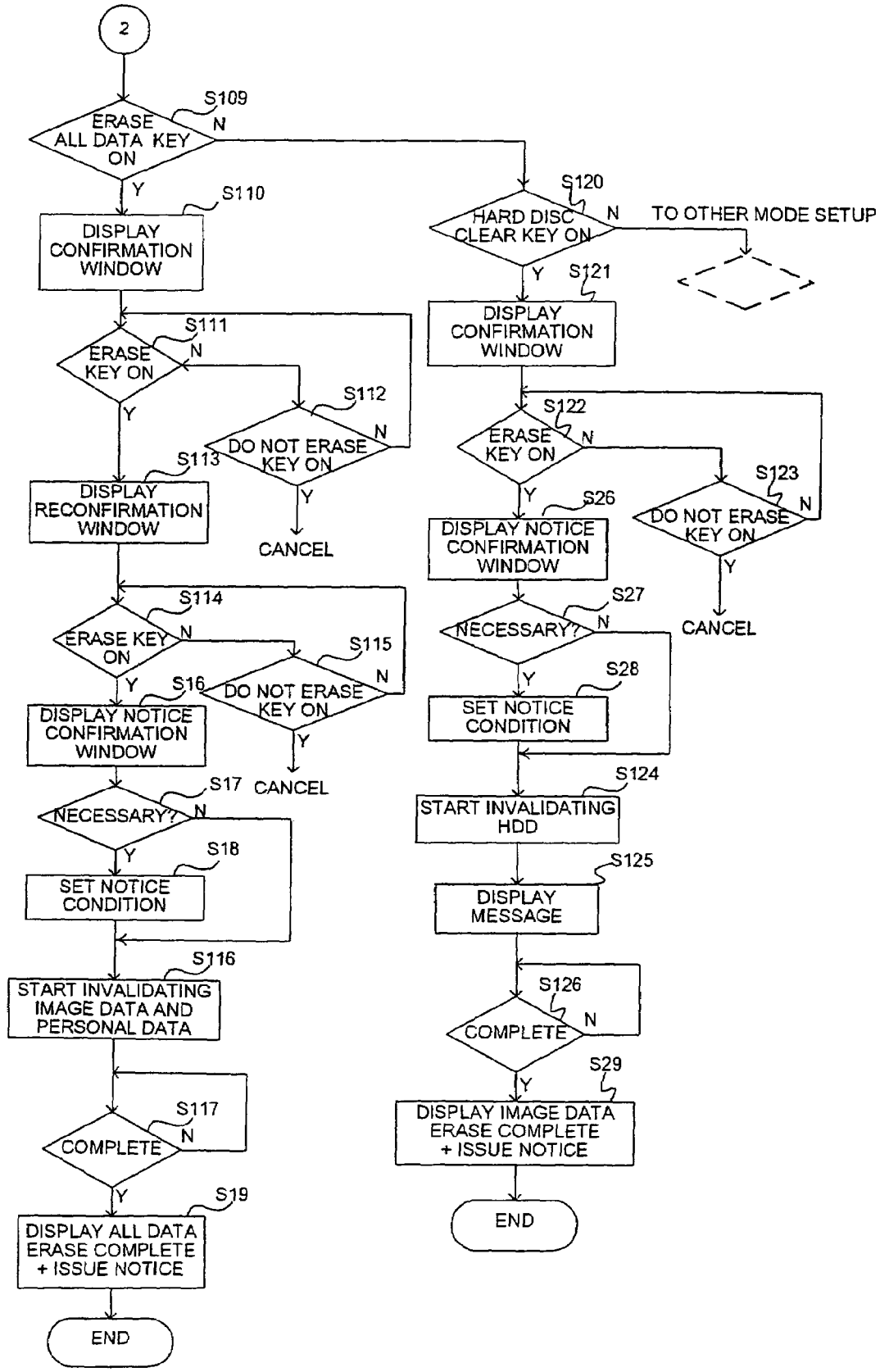
FIG. 16 is a flowchart showing the image data destruction process according to embodiment 2 of the invention.

Next, with reference to the flowchart of FIG. 16, the process for destructing (invalidating) the image data area in the memory such as the HDD equipped to the digital multifunctional device and the process for issuing a notice of completion of the destruction process will be explained.

As for the basic process flow, the process is started by manipulating a key 23 for "user setup" provided on the control panel 21. The steps 101 through 114 are the same as those of embodiment 1, so explanations thereof are omitted.

The specified right holder etc. selects the "erase" key 36A on the reconfirmation window 36 (S114). After confirming whether to output a notice of completion as explained later, the personal data such as the image data and the destination data required to process the image data in the hard disc (non-volatile memory) are all destructed (invalidated or erased) (S116 through S118). On the other hand, when the right holder selects the "do not erase" key 36B, the process for the erase all data mode is canceled (S115).

Figure 18:
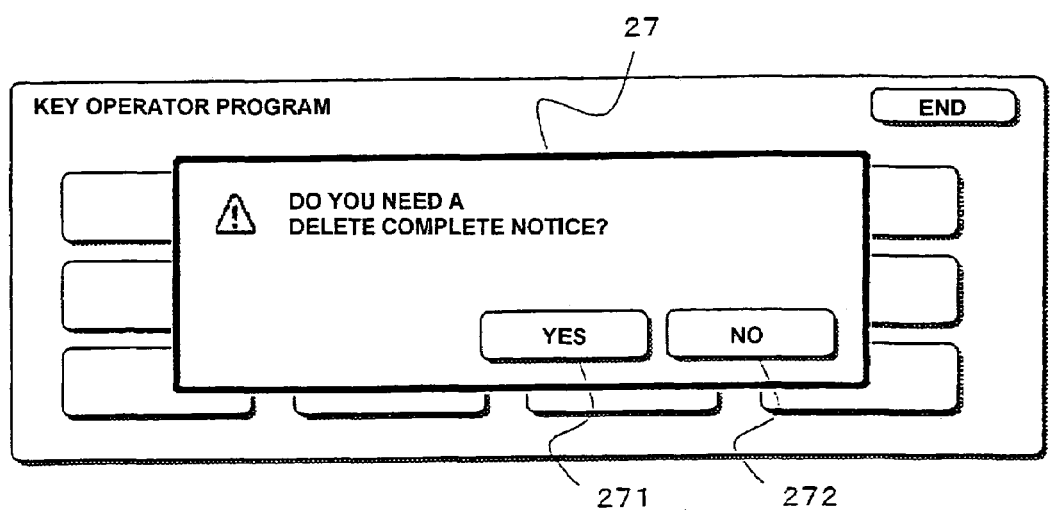
FIG. 18 is an explanatory view showing the specific setup screen of the key operator program displayed on the control panel.

In step S114, when the selection of the "erase" key 36A is confirmed, a window 27 for confirming whether a notice notifying completion of erase is required or not is displayed as shown in FIG. 18 (S16). When the right holder requires the notice, the "yes" key 271 on the window is selected, by which the window display is changed to the one shown in FIG. 19 according to which the method of notice is confirmed. On the other hand, when the administrator does not require the notice, the "no" key 272 on the window is selected (S17), by which the process for erasing the contents of the HDD is started (S116).

Figure 19:
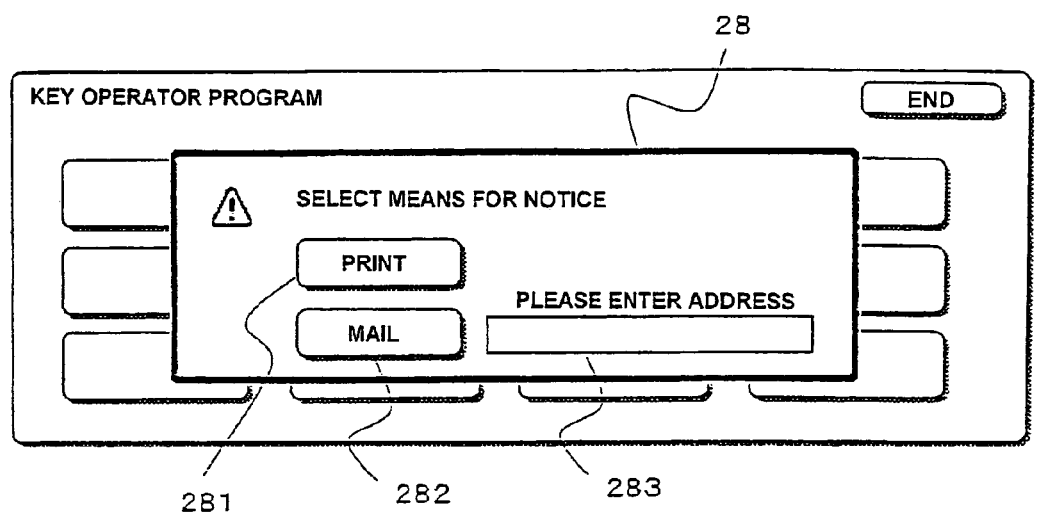
FIG. 19 is an explanatory view showing the specific setup screen of the key operator program displayed on the control panel.

When the "print" key 281 on the window display (display for selecting the method of notice and conditions thereof) 28 of FIG. 19 is selected, after the process erasing the contents of the HDD is completed, data related to the erase of HDD data and the completion of the erase process (refer to FIGS. 14 and 15) are printed out from the printer unit. If the "mail" key 282 demanding the notice to be sent via a communication means such as an email is selected, the destination such as the mail address is entered to the address column 283.

The administrator can enter the destination such as the mail address, for example, by selecting alphabets and symbols displayed on the panel or by use of the ten key, each key of the ten key being assigned to specific alphabets and symbols.

The data related to the notice is recorded and managed on the management table, while the process for erasing the contents of the HDD is started (S18) In the process for erasing the contents of the HDD, the image data and the personal data such as the destination data required to process the image data are all erased from the HDD (S116).

At this time, a window showing a message such as "Erasing contents of HDD . . . " can be displayed on the screen of the control panel so as to notify the specific right holder that the data in the hard disc is being destructed (invalidated or erased).

When the operation of the destruction of data on the hard disc is completed (S117), a display indicating that the destruction operation of all the data within the device has been completed is displayed on the screen of the control panel, and the completion notice is output if requested by the right holder and based on the method of notice (conditions) as confirmed in advance (S19). If the right holder selects printout using a recording medium as the notifying method in S18, the contents of notice (confirmation) 200A as shown in FIG. 14 is printed on a recording medium, thus notifying that the process has been completed.

Next, the process for invalidating only the image data stored in the device when the "HDD clear" key 34B has been selected will be explained.

Figure 17:
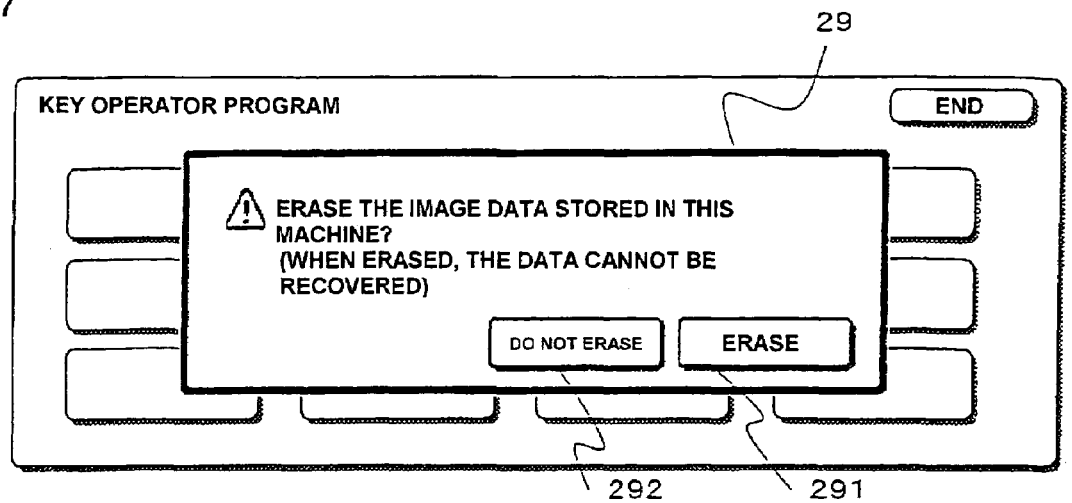
FIG. 17 is an explanatory view showing the specific setup screen of the key operator program displayed on the control panel.

While the operator program screen shown in FIG. 9 is displayed on the control panel, the "HDD clear" key 34B is selected (S120), and the confirmation window shown in FIG. 17 is displayed (S23). If on this screen the "erase" key 291 is selected (S122), the procedure advances to the step for destructing (invalidating or erasing) the image data stored in the hard disc (S26), and if the "do not erase" key 292 is selected (S123), the present mode is canceled.

When the selection of the "erase" key 291 is confirmed in step S122, a window 27 (FIG. 18) is displayed for confirming whether a notice for notifying the completion of erase is required or not (S26). When the specified right holder requires the notice, the "yes" key 271 on the window display is selected, and the window display is advanced to the one shown in FIG. 19 in which the method for notification is confirmed. However, when the notice is not required, the "no" key 272 on the window display is selected, and the procedure advances to the process for erasing the contents of the HDD (S124).

If the "print" key 281 on the window display (FIG. 19) is selected, after the process for erasing the contents of the HDD is completed, the printer unit prints out the data related to the erasing of the HDD data and the completion of the erasing process (the notice 180B shown in FIG. 15). If the "mail" key 282 demanding a notice to be sent via a communication means such as an email is selected, the destination of the notice such as the mail address is entered (S28). The data related to the notice is managed on the managing table, and the procedure advances to the process for erasing the contents of the HDD.

When the destruction (invalidation/erase) of the image data on the hard disc is started (S124), a message indicating that the destruction is underway is displayed as a window (S125), and when the erasing of the image data is completed (S126), a display notifying the right holder that the erase operation of the image data on the hard disc has been completed is shown on the LCD screen, and the notice of completion is output based on whether such notice is requested or not and by the method being set (S29).

The documents shown in FIGS. 14 and 15 illustrate examples of how the contents of the erased data, the name of the model, and the date and time of the process are described, but the contents of the notice are not limited to those illustrated, and the notice can take any form as long as it shows that the data has been erased.

As explained above, according to the present image processing device, when the image processing device equipped with an image data storage means is to be replaced and discarded, the image data stored in the image data storage means can be destructed by use of an image data destruction means. When the stored image data is destructed by the image data destruction means, the operation restriction means restricts the subsequent operations for processing the image data, so as to effectively prevent the leaks of personal image data and the like that have been stored to the image processing device at its previous location.

Moreover, since the operation means comprises a destruction designating means for designating the image data destruction means to destruct the stored image data, the administrator of the device can arbitrarily instruct the destruction designating means to destruct the stored image data and to restrict the operations for processing the image data. Thus, the administrator of the device can be reassured that personal data will not be leaked when replacing or discarding the image processing device.

Since the image data destruction means comprises a function for destructing not only the image data stored in the image data storage means but also the related data required for processing the image data, the destination information of the image data required for processing the image data or the personal information related to the user at the site where the device is located can be destroyed together with the image data by the image data destruction means, so the administrator of the device can feel reassured about confidentiality when the image processing device is to be replaced or discarded.

Moreover, the operation restriction means comprises a function to restrict the operation for processing image data and to display the information related to the restriction on the display unit of the manipulation means, so the user can be informed that the operation for processing the image data is restricted. Therefore, the user of the device can confirm that the image processing operation is restricted, and be reassured.

When a predetermined operation to the image processing device such as the replacement of the image data storage means is confirmed while the operation for processing the image data is restricted by the operation restriction means, the restriction to the operation for processing the image data by the operation restriction means can be cancelled, so that the imaged at a storage means can be replaced safely and the processing ability of the device as a whole can be improved by installing an image data storage means with upgraded performance.

Furthermore, the image processing device capable of having its image data stored in the image data storage means completely destructed before being put to resale promotes the efficient reuse of resources.

Even further, after the image data stored in the storage device and the information required for processing the image data are completely destructed (erased or invalidated) from the storage device of the image processing device based on the instructions from the administrator, the completion of the destruction process is notified to the administrator, reassuring the administrator that the device is ready to be discarded or replaced.

The notice of completion of the destruction process can be kept as a confirmation.

What is claimed is:

1. An image processing device comprising:
    an operation unit with a display for determining various settings;
    an image data storage unit for temporarily storing an image data to be newly processed;
    an image data destruction unit for destroying the image data stored in said image data storage unit; and
    an operation restricting unit for restricting storage of image data to be newly processed and for restricting operations for processing the stored image date to be newly processed when a demand for the image processing device to destroy the image data stored in the image processing device is made and said image data destruction unit destroys the stored image data.

2. An image processing device according to claim 1, wherein said operation restricting unit comprises a destruction designating unit for demanding said image data destruction unit to destroy the stored image data.

3. An image processing device according to claim 1, wherein said image data destruction unit destroys a related information required for processing the stored image data together with the stored image data.

4. An image processing device according to claim 1, wherein said operation restricting unit comprises a function to restrict said operations for processing the stored image data and a function to display information related to the restriction on the display of said operation unit.

5. An image processing device according to claim 1, wherein said operation unit comprises a function to cancel a restriction by the operation restricting unit provided to the operations for processing the stored image data to be newly processed when a predetermined operation has been verified while said operation restricting unit is restricting the operation for processing the stored image data.

6. An image processing device comprising:
   an operation unit with a display for determining various settings;
   an image data storage unit for temporarily storing an image data to be newly processed to an image data storage region;
   an image data destruction unit for destroying said image data storage region;
   an operation restricting unit for restricting storage of an image data to be newly processed and for restricting for processing the image data to be newly processed when a demand for the image processing device to destroy the image data stored in the image processing device is made and said image data destruction unit destroys the stored image data; and
   a notifying unit for notifying the completion of destruction of said image data storage region by said image data destruction unit to a predetermined specific right holder.

7. An image processing device according to claim 6, wherein said notifying unit enables a notifying condition to be selected.

8. An image processing device according to claim 7, wherein said notifying condition of said notifying unit is selected between an output using a printer function and an output performed by transmitting a notification image data via a network.

9. An image processing device according to claim 6, wherein said notifying unit outputs a notice corresponding to a selected notifying condition when all areas of said image data storage region of said image storage unit have been destroyed completely by said image data destruction unit.

10. An image processing device according to claim 6, wherein said image data destruction unit comprises a function to destroy a related information required for processing the stored image data together with the stored image data.

* * * * *